United States Patent
Morise

(10) Patent No.: US 11,585,438 B2
(45) Date of Patent: Feb. 21, 2023

(54) VEHICLE PARKING LOCK MECHANISM

(71) Applicant: TOYOTA JIDOSHA KABUSHIKI KAISHA, Aichi-ken (JP)

(72) Inventor: Masaru Morise, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/338,674

(22) Filed: Jun. 4, 2021

(65) Prior Publication Data
US 2022/0018434 A1  Jan. 20, 2022

(30) Foreign Application Priority Data

Jul. 17, 2020 (JP) .............................. JP2020-123255

(51) Int. Cl.
*F16H 63/34* (2006.01)
*B60T 1/00* (2006.01)

(52) U.S. Cl.
CPC .......... *F16H 63/3425* (2013.01); *B60T 1/005* (2013.01)

(58) Field of Classification Search
CPC ................. F16H 63/3425; F16H 63/38; F16H 63/34–38; B60T 1/005
See application file for complete search history.

(56) References Cited

U.S. PATENT DOCUMENTS

| | | | | |
|---|---|---|---|---|
| 8,387,759 B2* | 3/2013 | Prix | ................... | F16H 63/3416 192/219.5 |
| 2014/0190784 A1* | 7/2014 | Yokota | ............... | F16H 61/0025 192/219.5 |
| 2020/0378497 A1* | 12/2020 | Hall | ........................ | B60T 1/005 |
| 2021/0381595 A1* | 12/2021 | List | .......................... | F16H 63/36 |
| 2021/0396310 A1* | 12/2021 | Kraemer | ............. | F16H 63/3416 |

FOREIGN PATENT DOCUMENTS

| | | |
|---|---|---|
| DE | 10144056 A1 | 3/2003 |
| DE | 102012012673 A1 | 12/2013 |
| DE | 202018106497 U1 | 12/2019 |
| EP | 3067591 A1 | 9/2016 |
| JP | 2018141520 A | 9/2018 |
| WO | WO-2017006008 A1 * 1/2017 ......... F16H 63/3433 |

OTHER PUBLICATIONS

DE 102012012673 (Year: 2013).*

* cited by examiner

*Primary Examiner* — Charles A Fox
*Assistant Examiner* — Farhana Pervin
(74) *Attorney, Agent, or Firm* — Hauptman Ham, LLP

(57) ABSTRACT

In a vehicle parking lock mechanism, a parking pawl mechanically hinders rotation of the parking gear by being engaged with the parking gear. A lock member is moved to the lock position to establish a parking lock state in which the parking pawl hinders rotation of the parking gear. The support member includes a guide portion configured to guide movement of the lock member between the lock position and the unlock position while restricting the lock member from displacing in a direction away from the parking pawl. The stopper is rotatably mounted to either one member of the lock member or the support member, changes a posture in accordance with relative movement between the lock member and the support member, and protrudes toward the other member side of the lock member such that the stopper establishes a protruding posture in the parking lock state.

16 Claims, 8 Drawing Sheets

VEHICLE PARKING LOCK MECHANISM

CROSS-REFERENCE TO RELATED APPLICATION

This application claims priority to Japanese Patent Application No. 2020-123255 filed on Jul. 17, 2020, incorporated herein by reference in its entirety.

BACKGROUND

1. Technical Field

The present disclosure relates to a vehicle parking lock mechanism, and more particularly to a technique for suppressing a parking pawl from coming off a parking gear (hereinafter referred to as P-removal) while the vehicle is in a parked state in which a P range is selected.

2. Description of Related Art

A vehicle parking lock mechanism is known that includes: a parking gear; a parking pawl that is provided so as to be brought closer to and separated from the parking gear and that mechanically hinders rotation of the parking gear by being engaged with the parking gear; a lock member that is provided so as to be reciprocally movable between a lock position and an unlock position and that brings, when the lock member is moved to the lock position, the parking pawl closer to the parking gear via a cam mechanism such that the lock member is moved to the lock position to establish a parking lock state in which the parking pawl hinders rotation of the parking gear; and a support member that is provided on an opposite side of the lock member from the parking pawl and that includes a guide portion that guides movement of the lock member between the lock position and the unlock position while restricting the lock member from displacing in a direction away from the parking pawl. A device described in Japanese Unexamined Patent Application Publication No. 2018-141520 (JP 2018-141520 A) is an example thereof, in which a wedge corresponds to the lock member.

In such a vehicle parking lock mechanism, when the P range for parking is selected by a shift lever or the like, the lock member is moved to the lock position and the parking pawl is engaged with the parking gear so that a wheel is locked so as not to be rotatable via the rotating shaft on which the parking gear is provided. In that case, if the road surface slope of the parked place is large, a pushing load that pushes the parking pawl out of the parking gear may be generated in accordance with rotational torque applied to the parking gear by the weight of the vehicle, and the pushing load may cause the lock member to be retracted to the unlock position side, causing the P-removal in which the parking pawl comes off the parking gear. In view of this, in JP 2018-141520 A, a stopper (wedge restricting means) is provided in the moving path of the lock member (wedge) so that the stopper can be advanced and retracted, and thus the stopper hinders retraction of the lock member to suppress the P-removal from occurring.

SUMMARY

However, in such a vehicle parking lock mechanism in the related art, there have been issues such as, since the lock member is brought into contact from the lateral direction with the stopper protruding to the moving path of the lock member, a bending load is applied to the stopper, and the required strength of each part including the stopper becomes high, resulting in an increase in size of the device and in the mounting space of the vehicle.

The present disclosure provides a vehicle parking lock mechanism that suppresses the P-removal from occurring when parking on a slope while suppressing an increase in size of the device.

A first aspect of the present disclosure relates to a vehicle parking lock mechanism including a parking gear, a parking pawl, a lock member, a support member, and a stopper. The parking pawl is provided so as to be brought closer to and separated from the parking gear and is configured to mechanically hinder rotation of the parking gear by being engaged with the parking gear. The lock member is provided so as to be reciprocally movable between a lock position and an unlock position and is configured to, when the lock member is moved to the lock position, bring the parking pawl closer to the parking gear via a cam mechanism such that the lock member is moved to the lock position to establish a parking lock state in which the parking pawl hinders rotation of the parking gear. The support member is provided on an opposite side of the lock member from the parking pawl and includes a guide portion configured to guide movement of the lock member between the lock position and the unlock position while restricting the lock member from displacing in a direction away from the parking pawl. The stopper is rotatably mounted to either one member of the lock member or the support member, is configured to change a posture in accordance with relative movement between the lock member and the support member, and is configured to, in the parking lock state, protrude toward the other member side of the lock member and the support member to be engaged with the other member to establish a protruding posture.

According to the vehicle parking lock mechanism in the first aspect, the stopper is rotatably provided on one of the lock member and the support member, and the stopper takes the protruding posture where the stopper protrudes toward the other member side of the lock member and the support member in the parking lock state. Therefore, when the pushing load for pushing the parking pawl out of the parking gear is generated and the pushing load is applied from the parking pawl to the lock member via the cam mechanism when parking on a slope, the stopper in the protruding posture is compressed between the lock member and the support member. As a result, since the stopper bears a part of the pushing load acting on the lock member, the force applied to the lock member in the retracting direction toward the unlock position side based on the pushing load is reduced, and the P-removal where the parking pawl comes off the parking gear due to the retraction is suppressed from occurring. In that case, since the stopper is compressed between the lock member and the support member and receives a compressive load, the strength required for the stopper and the like is reduced as compared with the case where a bending load is applied as in the related art, and it is possible to reduce the size of the stopper and the like.

In the vehicle parking lock mechanism of the first aspect described above, in the parking lock state, a gap between the stopper in the protruding posture and the other member may be equal to or less than a gap between the lock member and the guide portion.

According to the vehicle parking lock mechanism having the above configuration, the gap between the stopper, which is in the protruding posture in the parking lock state, and the other member is equal to or less than the gap between the lock member and the guide portion. Therefore, when the pushing load is applied to the lock member, the stopper is reliably compressed between the lock member and the support member, and the effect of suppressing the P-removal from occurring when parking on a slope can be appropriately obtained.

In the vehicle parking lock mechanism of the first aspect described above, the stopper may be urged by an urging device so as to be in the protruding posture. The other member may include a posture changing portion configured to be engaged with the stopper when the lock member is moved from the lock position to the unlock position such that the stopper changes a posture to a retracted posture against an urging force of the urging device, enabling the lock member to be guided by the guide portion.

According to the vehicle parking lock mechanism having the above configuration, while the stopper is urged by the urging device so as to be in the protruding posture, the other member is provided with the posture changing portion that changes the stopper to the retracted posture when the lock member is moved to the unlock position. In this way, the stopper is reliably changed to the protruding posture and the retracted posture in accordance with the position of the lock member. As a result, in the process of moving the lock member from the unlock position to the lock position, the stopper is held in the retracted posture, and the lock member is guided by the guide portion so that the parking pawl is engaged with the parking gear via the cam mechanism to be in the parking lock state, and in the parking lock state, the stopper is held in the protruding posture so that the P-removal when parking on a slope can be appropriately suppressed from occurring.

In the vehicle parking lock mechanism of the first aspect described above, the cam mechanism may include a pair of a first roller and a second roller and a cam surface. The first roller and the second roller may be provided on the lock member so as to be rotatable around axes perpendicular to a moving direction of the lock member and parallel to each other such that outer peripheral surfaces are in contact with each other. The cam surface may be provided on the parking pawl and configured to be engaged with the first roller when the lock member is moved from the unlock position to the lock position such that the parking pawl is brought closer to the parking gear to be engaged with the parking gear. In addition, the second roller may be configured to be engaged with the guide portion when the lock member is moved from the unlock position to the lock position such that the lock member is restricted from displacing in a direction away from the parking pawl.

According to the vehicle parking lock mechanism having the above configuration, when the cam mechanism includes the pair of the first roller and the second roller provided on the lock member and the cam surface provided on the parking pawl, the first roller is engaged with the cam surface and the second roller is engaged with the guide portion, so that the lock member can be moved smoothly between the lock position and the unlock position with the rotation of the first roller and the second roller. In this case, when the pushing load that pushes the parking pawl out of the parking gear is generated when parking on a slope, the lock member may easily move to the unlock position side due to the pushing load and the P-removal may occur. Thus, the effect of providing the stopper to suppress the P-removal from occurring when parking on a slope can be remarkably obtained.

In the vehicle parking lock mechanism of the first aspect described above, the stopper may be mounted to the lock member so as to be rotatable around a rotation axis perpendicular to the moving direction of the lock member. In addition, an engaging portion of the stopper in the protruding posture with the support member that is the other member may include a portion located further on the unlock position side than the rotation axis in the moving direction of the lock member.

According to the vehicle parking lock mechanism having the above configuration, when the stopper is mounted to the lock member, the engaging portion between the stopper in the protruding posture and the support member includes a portion located further on the unlock position side than the rotation axis. Thus, when the pushing load acts on the lock member and a force in the direction of moving the lock member to the unlock position side is applied, the stopper changes its posture with an engaging point on the support member side acting as the support point, pushing back the lock member to the parking pawl side, and hindering the movement of the lock member to the unlock position side, which appropriately suppresses the P-removal from occurring.

In the vehicle parking lock mechanism of the above configuration, an engaging surface of the engaging portion on the support member side that is engaged with the stopper may be inclined in a direction away from the rotation axis toward the lock position side with respect to a straight line parallel to the moving direction of the lock member. An inclination angle in the direction away from the rotation axis may be an angle within a range of 0.5° to 2°.

According to the vehicle parking lock mechanism having the above configuration, since the engaging surface on the support member side to be engaged with the stopper is inclined in a direction away from the rotation axis toward the lock position side, when the pushing load acts on the lock member and the stopper is pressed against the support member, based on the inclination of the engaging surface of the support member, torque is generated in the direction in which the rotation axis of the stopper is directed toward the lock position side, and a force is applied to the lock member in the direction toward the lock position side from the stopper, so that the movement of the lock member to the unlock position side is hindered and the P-removal is further appropriately suppressed from occurring.

In the vehicle parking lock mechanism of the above configuration, an engaging surface of the engaging portion on the stopper side that is engaged with the support member may be inclined in a direction closer to the rotation axis toward the lock position side with respect to a straight line parallel to the moving direction of the lock member. An inclination angle in the direction closer to the rotation axis may be an angle within a range of 0.5° to 2°.

According to the vehicle parking lock mechanism having the above configuration, since the engaging surface on the stopper side to be engaged with the support member is inclined in a direction closer to the rotation axis toward the lock position side, when the pushing load acts on the lock member and the stopper is pressed against the support member, based on the inclination of the engaging surface of the stopper, torque is generated in the direction in which the rotation axis of the stopper is directed toward the lock position side, and a force is applied to the lock member in the direction toward the lock position side from the stopper, so that the movement of the lock member to the unlock position side is hindered and the P-removal is further appropriately suppressed from occurring.

In the vehicle parking lock mechanism of the first aspect described above, the stopper may be mounted to the support member so as to be rotatable around a rotation axis perpendicular to the moving direction of the lock member. An engaging portion of the stopper in the protruding posture with the lock member that is the other member may include a portion located further on the lock position side than the rotation axis in the moving direction of the lock member.

According to the vehicle parking lock mechanism having the above configuration, when the stopper is mounted to the support member, the engaging portion between the stopper in the protruding posture and the lock member includes a portion located further on the lock position side than the rotation axis. Thus, when the pushing load acts on the lock member and a force in the direction of moving the lock member to the unlock position side is applied, the stopper changes its posture around the rotation axis on the support member side, pushing back the lock member to the parking pawl side, and hindering the movement of the lock member to the unlock position side, which appropriately suppresses the P-removal from occurring.

In the vehicle parking lock mechanism of the above configuration, an engaging surface of the engaging portion on the lock member side that is engaged with the stopper may be inclined in a direction away from the rotation axis toward the unlock position side with respect to a straight line parallel to the moving direction of the lock member. An inclination angle in the direction away from the rotation axis may be an angle within a range of 0.5° to 2°.

According to the vehicle parking lock mechanism having the above configuration, since the engaging surface on the lock member side to be engaged with the stopper is inclined in a direction away from the rotation axis toward the unlock position side, when the pushing load acts on the lock member and the lock member is pressed against the stopper, based on the inclination of the engaging surface of the lock member, torque is generated in the stopper in the direction causing the stopper to rotate toward the lock position side, and a force is applied to the lock member in the direction toward the lock position side from the stopper, so that the movement of the lock member to the unlock position side is hindered and the P-removal is further appropriately suppressed from occurring.

In the vehicle parking lock mechanism of the above configuration, an engaging surface of the engaging portion on the stopper side that is engaged with the lock member may be inclined in a direction closer to the rotation axis toward the unlock position side with respect to a straight line parallel to the moving direction of the lock member. An inclination angle in the direction closer to the rotation axis may be an angle within a range of 0.5° to 2°.

According to the vehicle parking lock mechanism having the above configuration, since the engaging surface on the stopper side to be engaged with the lock member is inclined in a direction closer to the rotation axis toward the unlock position side, when the pushing load acts on the lock member and the lock member is pressed against the stopper, based on the inclination of the engaging surface of the stopper, torque is generated in the stopper in the direction causing the stopper to rotate toward the lock position side, and a force is applied to the lock member in the direction toward the lock position side from the stopper, so that the movement of the lock member to the unlock position side is hindered and the P-removal is further appropriately suppressed from occurring.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
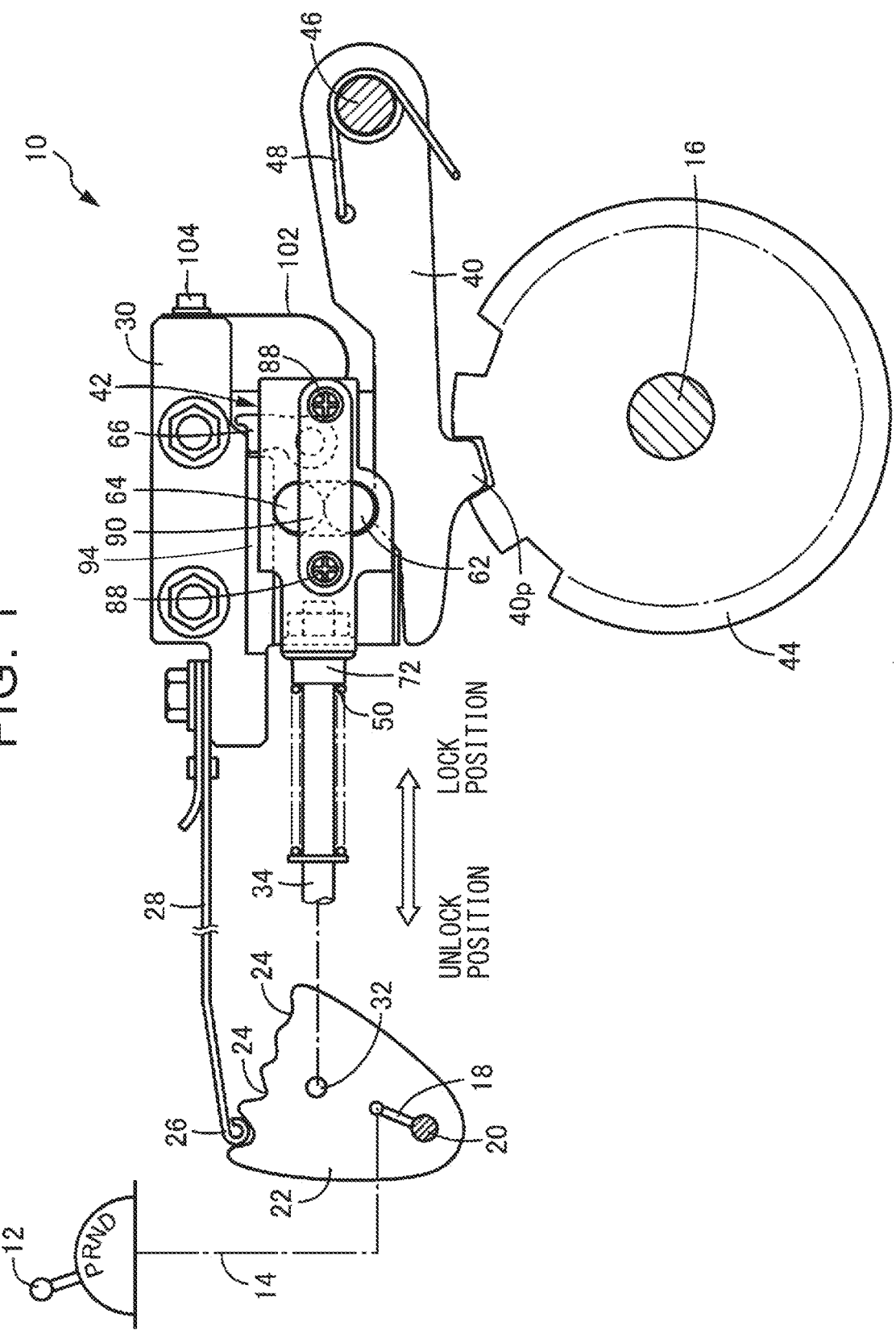
FIG. 1 is a diagram illustrating a vehicle parking lock mechanism according to a first embodiment, which is an example of the present disclosure, and is a schematic configuration diagram showing a parking lock state.

A vehicle parking lock mechanism of the present disclosure is applied to a manually operated parking lock mechanism in which the shift range is mechanically switched by, for example, a shift lever via an interlocking device such as a link or a cable. The vehicle parking lock mechanism of the present disclosure can also be applied to a shift-by-wire (SBW) parking lock mechanism in which a shift range selected by a shift range selection device such as a shift lever is electrically established by an electric shift actuator or a hydraulic shift actuator or the like. The shift range has at least a parking (P) range for parking that shuts off power transmission and mechanically hinders the rotation of the output shaft, and when the P range is selected, the parking lock mechanism is brought into the parking lock state. In addition to the P range, there are, for example, a drive (D) range that allows traveling forward and a reverse (R) range that allows traveling backward. The vehicle can be applied to various vehicles such as an engine-driven vehicle that generates power by burning fuel, an electric vehicle driven by an electric motor, or a hybrid vehicle having a plurality of power sources.

The parking gear is provided on a rotating shaft (output shaft, etc.) that is mechanically rotated as the wheel rotates, and when the parking pawl is engaged with the parking gear, the rotation of the rotating shaft and further, the rotation of the wheel are mechanically hindered. The lock member is provided at the tip portion of the parking rod, for example, is reciprocated to the lock position and the unlock position together with the parking rod, and can be retracted to the unlock position side by an urging device such as a spring member.

In the protruding posture of the stopper in the parking lock state, when rotational torque is applied to the parking gear by the weight of the vehicle on a slope or the like, a pushing load for pushing the parking pawl out of the parking gear is generated, and when the pushing load is applied from the parking pawl to the lock member via the cam mechanism, at least a part of the pushing load may be transmitted to the support member via the stopper. That is, even if there is a gap between the stopper and the other member before the pushing load is applied, the stopper only needs to be brought into contact with the other member due to elastic deformation of each portion or the like before the lock member is retracted when the pushing load is applied. If the gap between the stopper and the other member in the parking lock state is equal to or less than the gap between the lock member and the guide portion, the stopper is reliably brought into contact with the other member when the pushing load is applied. Even if the gap between the stopper and the other member in the parking lock state is larger than the gap between the lock member and the guide portion, the stopper only needs to be brought into contact with the other member by elastic deformation of each portion or the like before the lock member is retracted.

The stopper is urged to establish a protruding posture by, for example, an urging device, and when the lock member is moved from the lock position to the unlock position, the posture changing portion changes the posture to the retracted posture. In contrast, the stopper may be urged to establish a retracted posture by the urging device and changed to the protruding posture by the posture changing portion. When the stopper is engaged with an elongated hole or the like provided in the other member and the posture is mechanically changed between the protruding posture and the retracted posture as the lock member and the support member move relative to each other, the urging device can be omitted. A spring member is suitable as the urging device, but other elastic bodies and the like can also be used.

The cam mechanism has, for example, a pair of first and second rollers provided on the lock member so that the outer peripheral surfaces are in contact with each other. The first roller is configured to be engaged with a cam surface provided on the parking pawl and the second roller is configured to be engaged with the guide portion. However, various modes can be implemented, for example, the second roller can be omitted, and the wedge (wedge member) described in JP 2018-141520 A may be used as a cam mechanism and a lock member. The first and second rollers are provided on the lock member so as to be displaceable in a direction perpendicular to the moving direction of the lock member, for example, but the first and second rollers can also be mounted to the lock member via a support pin or the like so as not to be displaceable. The first roller and the second roller are provided on the lock member so that, for example, the outer peripheral surfaces of the first roller and the second roller are in rolling contact with each other, but the first roller and the second roller may be provided on the lock member so as to be separated from each other and so as not to be in contact with each other.

When the stopper is mounted to the lock member, the engaging portion between the stopper in the protruding posture and the support member is determined to include the same position as the rotation axis in the moving direction of the lock member, but it is desirable that the engaging portion includes a portion located further closer to the unlock position than the rotation axis. Further, the engaging surfaces of the engaging portion between the stopper and the support member are determined to be parallel to the moving direction of the lock member, for example. However, various modes can be implemented, for example, the engaging surface of the engaging portion on the support member side may be inclined in a direction away from the rotation axis toward the lock position side, the engaging surface on the stopper side may conversely be inclined in a direction closer to the rotation axis toward the lock position side, and both engaging surfaces may be inclined.

When the stopper is mounted to the support member, the engaging portion between the stopper in the protruding posture and the lock member is determined to include the same position as the rotation axis in the moving direction of the lock member, but it is desirable that the engaging portion includes a portion located further closer to the lock position than the rotation axis. Further, the engaging surfaces of the engaging portion between the stopper and the lock member are determined to be parallel to the moving direction of the lock member, for example. However, various modes can be implemented, for example, the engaging surface of the engaging portion on the lock member side may be inclined in a direction away from the rotation axis toward the unlock position side, the engaging surface on the stopper side may conversely be inclined in a direction closer to the rotation axis toward the unlock position side, and both engaging surfaces may be inclined.

Hereinafter, a first embodiment of the present disclosure will be described in detail with reference to the drawings. Note that, in the following embodiment, the drawings are appropriately simplified or modified for convenience of description, and the dimensional ratios and shapes of the respective parts are not necessarily drawn accurately.

FIG. 1 is a schematic configuration diagram illustrating a vehicle parking lock mechanism 10 of the first embodiment, which is an example of the present disclosure. The vehicle parking lock mechanism 10 is a manually operated parking lock mechanism in which the shift range is mechanically switched by a shift lever 12 via an interlocking device 14 such as a link or a push-pull cable. The shift lever 12 is provided near the driver's seat so that it can be rotated to four positions of parking (P), reverse (R), neutral (N), and drive (D) in accordance with the shift operation of the driver. The P position is a shift operation position for selecting a P range for parking that shuts off power transmission and mechanically hinders rotation of an output shaft 16 of the automatic transmission. The R position is a shift operation position for selecting an R range that enables reverse travel. Further, the N position is a shift operation position for selecting an N range that shuts off power transmission, and the D position is a shift operation position for selecting a D range that enables forward traveling.

The shift lever 12 is connected to an outer lever 18 via the interlocking device 14. The outer lever 18 is fixed to a manual shaft 20, and a detent plate 22 is fixed to the manual shaft 20. Thus, the detent plate 22 is rotated around the axis of the manual shaft 20 in accordance with the shift operation position of the shift lever 12, and is positioned at four rotation positions, namely, the P position, the R position, the N position, and the D position. The tip portion of the detent plate 22 is provided with irregularities having four positioning recesses 24 so that a locking portion 26 is engaged with the positioning recesses 24. The locking portion 26 is a rounded tip portion of a spring plate 28, and is displaced along the irregularities by elastic deformation of the spring plate 28. The detent plate 22 is given a predetermined moderation (positioning force) at each rotation position of P, R, N, and D. The spring plate 28 is mounted to a support member 30 fixed to a transmission case or the like. FIG. 1 shows a state in which the shift lever 12 is shifted to the P position, and the detent plate 22 is mechanically rotated clockwise of the manual shaft 20 and held at the P position.

The detent plate 22 is provided with a connecting hole 32, and the base end portion of a parking rod 34 is connected to the detent plate 22 so as to be relatively rotatable. The parking rod 34 is reciprocated substantially linearly in the longitudinal direction, that is, in the right-left direction in FIG. 1, as the detent plate 22 rotates, and is moved to the lock position in the right direction and the unlock position in the left direction in FIG. 1. The lock position is a position when the shift lever 12 is shifted to the P position and the detent plate 22 is rotated clockwise of the manual shaft 20 to the P position as shown in FIG. 1. The unlock position is the position when the shift lever 12 is shifted to a non-P position such as the R position and the detent plate 22 is rotated counterclockwise of the manual shaft 20 to the non-P position such as the R position. A play mechanism may be provided between the shift lever 12 and the parking rod 34 so that the parking rod 34 is held at a constant unlock position in the non-P positions from the R position to the D position.

A lock member 42 that is engaged with a parking pawl 40 is provided at the tip portion of the parking rod 34, and the lock member 42 is moved to the lock position together with the parking rod 34, whereby the parking pawl 40 is rotated downward in FIG. 1 and a meshing tooth 40p is meshed with a parking gear 44. The parking gear 44 is mounted to the output shaft 16 of the automatic transmission so as not to rotate relative to the output shaft 16. The parking pawl 40 is provided in a transmission case or the like so as to be rotatable around the axis of a pawl shaft 46 parallel to the output shaft 16, and is urged to the un-meshing direction (clockwise direction in FIG. 1) by a return spring 48 that is an urging device, and the lock member 42 rotates the parking pawl 40 in the meshing direction (counterclockwise direction in FIG. 1) against the urging force of the return spring 48. That is, the parking pawl 40 is provided so that the meshing tooth 40p can be brought closer to and separated from the parking gear 44, and when the parking pawl 40 is rotated by the lock member 42 in the meshing direction that is downward in FIG. 1, the meshing tooth 40p is brought closer to the parking gear 44 and meshed with the parking gear 44, resulting in a parking lock state in which the rotation of the parking gear 44 and accordingly the rotation of the output shaft 16 and the wheel are mechanically hindered. FIG. 1 is a diagram showing this parking lock state.

The lock member 42 is urged toward the tip end side of the parking rod 34 by a spring member (compression coil spring in the first embodiment) 50 that is an urging device, and is held at the tip end position on the lock position side to rotate the parking pawl 40 in the meshing direction. However, when the parking pawl 40 and the parking gear 44 interfere with each other, the lock member 42 is allowed to retract toward the unlock position relative to the parking rod 34 against the urging force of the spring member 50. The lock member 42 is supported by the support member 30 so as to be linearly reciprocable between the lock position and the unlock position while having a predetermined play in a direction perpendicular to the moving direction (vertical direction in FIG. 1). Further, the manual shaft 20 is provided in a posture parallel to the output shaft 16 on the side opposite to the pawl shaft 46 with the output shaft 16 interposed therebetween, and the lock member 42 is allowed to approach the parking pawl 40 from the tip end side of the parking pawl 40 (left side in FIG. 1).

Figure 2:
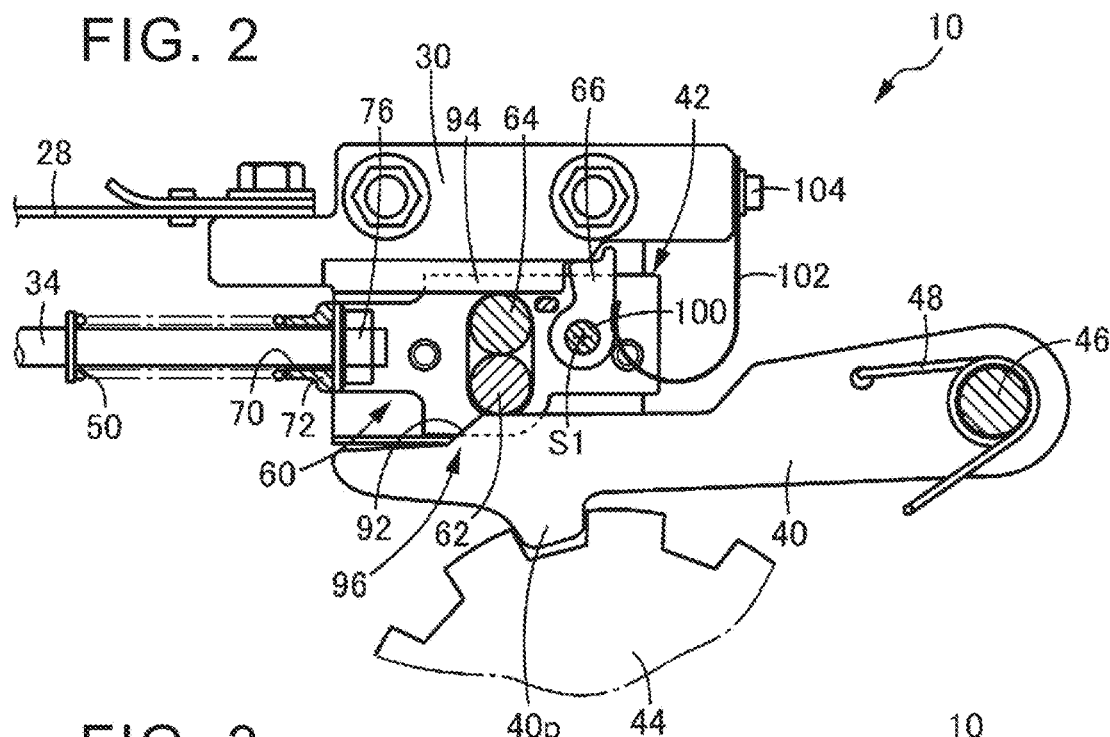
FIG. 2 is a diagram illustrating a portion near a lock member in the vehicle parking lock mechanism in FIG. 1, and is a diagram in which a part is cut out.
Figure 3:
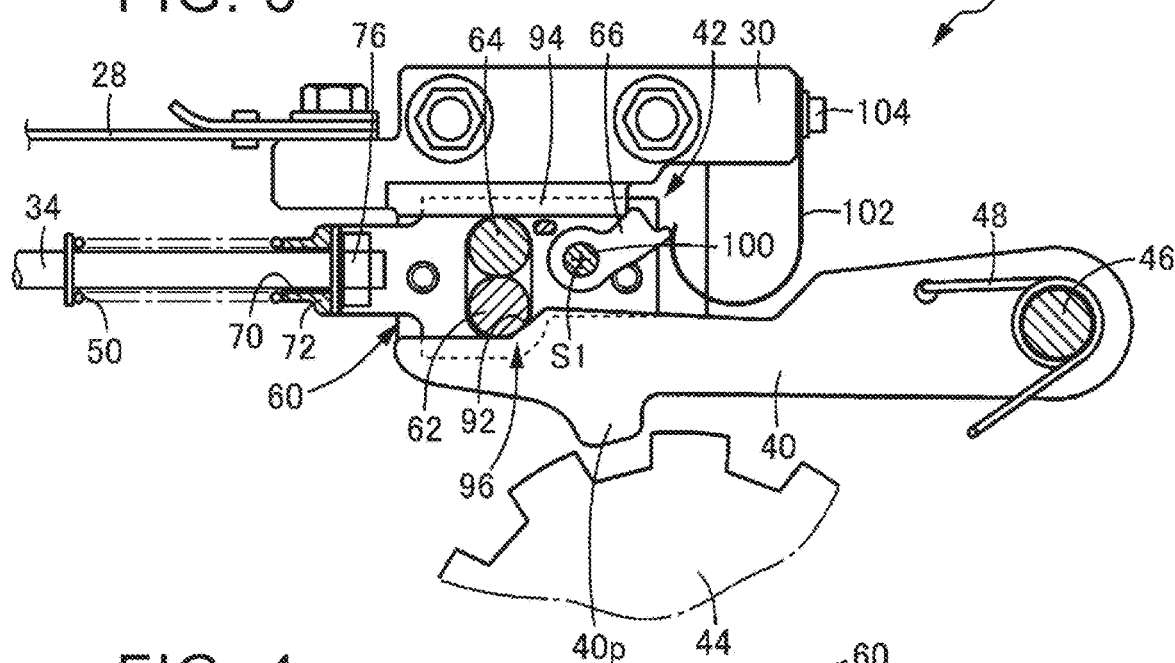
FIG. 3 is a diagram illustrating an unlocked state of the vehicle parking lock mechanism in FIG. 1, and is a diagram corresponding to FIG. 2.

FIGS. 2 and 3 are diagrams illustrating the lock member 42 and a portion near the lock member 42 in detail, and are diagrams in which a part is cut out. FIG. 2 shows the same parking lock state as in FIG. 1. FIG. 3 shows an unlocked state in which the lock member 42 is moved to the unlock position and the parking pawl 40 and the parking gear 44 are disengaged. Specifically, FIG. 3 shows a state where the shift lever 12 is shifted to the R position. In these figures, the lock member 42 includes a connecting head 60, a pair of a first roller 62 and a second roller 64, and a stopper 66.

Figure 4:
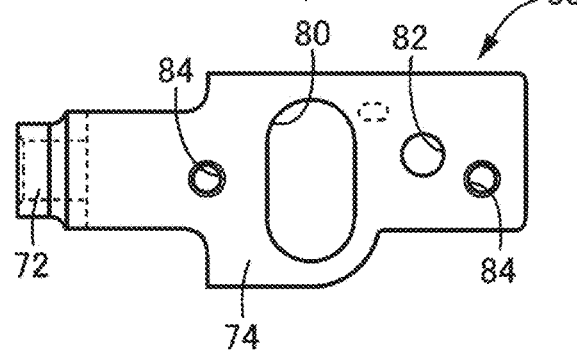
FIG. 4 is a front view showing solely a connecting head of the lock member provided in the vehicle parking lock mechanism in FIG. 1.
Figure 5:
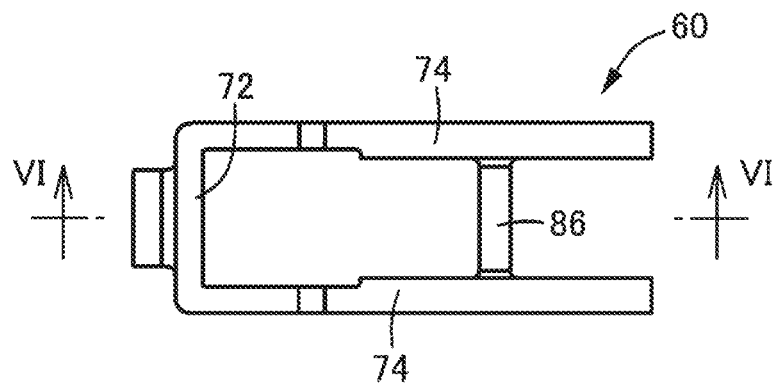
FIG. 5 is a plan view of the connecting head in FIG. 4.
Figure 6:
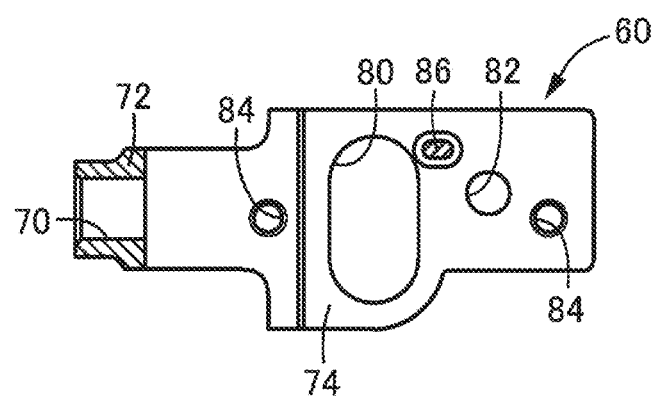
FIG. 6 is a sectional view seen from the VI-VI arrow in FIG. 5.

FIG. 4 is a front view showing the connecting head 60 alone, FIG. 5 is a plan view of the connecting head 60, and FIG. 6 is a sectional view seen from an VI-VI arrow in FIG. 5. The connecting head 60 has a substantially U-shaped bifurcated shape, and has a connecting portion 72 provided with an insertion hole 70 through which the parking rod 34 is inserted, and a pair of side wall portions 74 that are parallel to each other and that extend in the axial direction of the insertion hole 70 from both ends of the connecting portion 72. As shown in FIGS. 2 and 3, the parking rod 34 is inserted into the insertion hole 70 so as to be relatively movable in the axial direction, and a nut 76 is fixed to the tip portion of the parking rod 34 that protrudes to the inside of the connecting head 60 from the insertion hole 70. The spring member 50 is locked to the peripheral edge of the insertion hole 70. Thus, the connecting head 60 is held at the tip position of the parking rod 34 where the connecting portion 72 is normally brought into contact with the nut 76 in accordance with the urging force of the spring member 50, and is allowed to be separated from the nut 76 against the urging force of the spring member 50 and is allowed to retract in the direction of the unlock position relative to the parking rod 34.

The connecting head 60 is held by the support member 30 so as to have a posture in which the side wall portions 74 are perpendicular to the axis of the output shaft 16, that is, a posture in which the side wall portions 74 are parallel to the paper surface and separated from each other in the front and back directions of the paper surface in FIGS. 1 to 3. The side wall portions 74 are each provided with an oval elongated hole 80, a stopper mounting hole 82, and a pair of screw holes 84. The positions of the elongated hole 80, the stopper mounting hole 82, and the screw holes 84 are the same in the side wall portions 74. A reinforcing connecting portion 86 is provided near the stopper mounting holes 82 so as to connect the side wall portions 74.

The elongated hole 80 is an elongated hole that is long in a direction perpendicular to the longitudinal direction of the side wall portions 74, that is, in a direction perpendicular to the moving direction of the lock member 42, and as shown in FIGS. 2 and 3, holds the first roller 62 and the second roller 64 in a posture substantially parallel to the output shaft 16 with a predetermined play. The first roller 62 and the second roller 64 are supported by the elongated holes 80 of the side wall portions 74 at both ends so as to be rotatable around axes perpendicular to the moving direction of the lock member 42 and parallel to each other, and so that the outer peripheral surfaces are in contact with each other. The first roller 62 and the second roller 64 are hindered from falling off the connecting head 60 by a pair of holding plates 90 (see FIG. 1). The holding plates 90 are mounted to the side wall portions 74 by screws 88 screwed into the screw holes 84 so as to be in close contact with the outer surfaces of the side wall portions 74.

The first roller 62 and the second roller 64 are provided vertically side by side between the parking pawl 40 and the support member 30 provided on both sides of the lock member 42 in the vertical direction. The first roller 62 on the parking pawl 40 side is engaged with the parking pawl 40 when the lock member 42 is moved from the unlock position to the lock position, and brings the parking pawl 40 closer to the parking gear 44 so that the parking pawl 40 is engaged with the parking gear 44. The parking pawl 40 is provided with a cam surface 92 that is engaged with the first roller 62 to rotate the parking pawl 40 in the meshing direction. The cam surface 92 has an inclined surface that rotates the parking pawl 40 in the meshing direction, a lock side engaging surface that is provided continuously with the inclined surface on the lock position side, and an unlock side engaging surface that is provided continuously with the inclined surface on the unlock position side. The lock side engaging surface is a portion that is engaged with the first roller 62 in the parking lock state in FIG. 2, and is provided so as to be substantially parallel to the moving direction of the lock member 42 in the parking lock state. Further, the unlock side engaging surface is a portion that is engaged with the first roller 62 in the unlocked state in FIG. 3, and is provided so as to be substantially parallel to the moving direction of the lock member 42 in the unlocked state.

Further, the second roller 64 on the support member 30 side is for restricting the lock member 42 from displacing to the opposite side of the parking pawl 40, by engaging with a guide portion 94 provided on the support member 30 when the lock member 42 is moved between the lock position and the unlock position. The guide portion 94 is provided on the opposite side of the lock member 42 from the parking pawl 40 along a straight line parallel to the moving direction of the lock member 42, and guides the lock member 42 via the second roller 64 so that the lock member 42 moves between the lock position and the unlock position while restricting the lock member 42 from displacing in the direction away from the parking pawl 40. Therefore, when the lock member 42 is moved from the unlock position to the lock position, the first roller 62 and the second roller 64 are compressed between the parking pawl 40 and the guide portion 94 and rotate relative to each other while the outer peripheral surfaces are in contact with each other. Thus, the parking pawl 40 is rotated in the meshing direction by the engagement between the first roller 62 and the cam surface 92 while restricting the lock member 42 from displacing in the direction away from the parking pawl 40, whereby the parking pawl 40 can be engaged with the parking gear 44. In the first embodiment, a cam mechanism 96 including the first roller 62, the second roller 64, and the cam surface 92 is configured to bring the parking pawl 40 closer to the parking gear 44 and engage the parking pawl 40 with the parking gear 44.

As shown in FIGS. 2 and 3, the stopper 66 is mounted to the stopper mounting holes 82 via a mounting pin 100 so as to be rotatable around a rotation axis S1 perpendicular to the moving direction of the lock member 42, specifically, around the rotation axis S1 parallel to the output shaft 16. The mounting pin 100 protrudes from both sides of the stopper 66, and both ends of the mounting pin 100 are inserted into the stopper mounting holes 82 of the side wall portions 74 and supported, so that the stopper 66 is rotatably held between the side wall portions 74. The mounting pin 100 is also hindered from falling off the connecting head 60 by the holding plates 90 (see FIG. 1) that are mounted so as to be in close contact with the outer surfaces of the side wall portions 74. The axis of the mounting pin 100 may be the rotation axis S1, and the stopper 66 may be rotatably mounted to the mounting pin 100, or the mounting pin 100 may be rotatably mounted to the side wall portions 74.

The stopper 66 is rotated around the rotation axis S1 to change its posture between the protruding posture shown in FIG. 2 and the retracted posture shown in FIG. 3. A base end portion of a spring member (leaf spring in the first embodiment) 102 as an urging device is fixed to the support member 30 by a mounting bolt 104, and the tip portion of the spring member 102 that is bent in a J shape is locked to the stopper 66. The stopper 66 is held in a protruding posture due to the urging force of the spring member 102 in a state where the lock member 42 is moved to the lock position shown in FIG. 2. This protruding posture is a posture in which the stopper 66 protrudes toward the support member 30. As shown in an enlarged manner in FIG. 7, an engaging surface 66a provided at the tip portion of the stopper 66 is brought into close contact with an engaging surface 30a provided on the support member 30, and the stopper 66 is in a vertical posture in which the rotation axis S1 is located on the vertical line V1 of the engaging surfaces 30a and 66a. The engaging surface 30a is provided parallel to the guide portion 94, that is, parallel to the moving direction of the lock member 42 (right-left direction in FIG. 7), and is brought into close contact with the engaging surface 66a in an engagement range L1 including both sides of the vertical line V1 passing through the rotation axis S1 in the moving direction of the lock member 42. The engagement range L1 is appropriately determined in advance by an experiment or the like so that the desired P-removal suppressing effect can be obtained and the P-removal operation accompanying the shift operation of the shift lever 12 is appropriately performed, for example, within the range of approximately 1 mm to 3 mm. The engagement range L1 is about 2 mm in the first embodiment. The stopper 66 has a width dimension (about 12 mm in the first embodiment) slightly smaller than the inner dimension of the side wall portions 74 of the connecting head 60, and the engaging surfaces 30a and 66a have a rectangular, flat contact surface with about 2 mm×12 mm. The shape of the tip portion of the stopper 66 can be changed as appropriate to a shape within the range where the required strength can be obtained, such as a hemispherical shape so as to make substantially point contact with the support member 30, or a semi-cylindrical shape having a semicircular section so as to make line contact that is parallel to the rotation axis S1. The engaging surface 30a on the support member 30 side may have a hemispherical shape or a semi-cylindrical shape. In the first embodiment, the lock member 42 on which the stopper 66 is provided is one member, the support member 30 is the other member, and the engagement range L1 corresponds to the engaging portion.

Here, when rotational torque is applied to the parking gear 44 by the weight of the vehicle when parking on a slope, a pushing load for pushing the parking pawl 40 out of the parking gear 44 is generated in accordance with the rotational torque. When the pushing load is applied from the parking pawl 40 to the lock member 42 via the cam mechanism 96, the contact surface between the parking pawl 40 and the cam mechanism 96, specifically, the lock side engaging surface portion of the cam surface 92, may be inclined in a direction where the distance from the guide portion 94 increases toward the parking release position side (left side in FIG. 2) due to variations in the dimensions of the parts and the like, and thus a force may be added to the lock member 42 causing the lock member 42 to retract toward the unlock position side. The shape and arrangement position of the stopper 66 are determined so that the gap between the engaging surface 66a and the engaging surface 30a is equal to or less than the gap between the second roller 64 and the guide portion 94, and in the first embodiment, all the gaps are substantially zero, when no pushing load is applied, to cause the engaging surface 66a and the engaging surface 30a to be engaged with each other before the lock member 42 is retracted to the unlock position side in cases such as the above. In this way, when the engaging surface 66a and the engaging surface 30a are engaged with each other before the lock member 42 is retracted to the unlock position side due to the pushing load, and the stopper 66 is pressed against the support member 30, the stopper 66 functions as a tension pole, and since the stopper 66 bears a part of the pushing load acting on the lock member 42, the force applied to the lock member 42 in the retracting direction toward the unlock position side based on the pushing load is reduced, and the P-removal where the parking pawl 40 comes off the parking gear 44 due to the retraction is suppressed from occurring. That is, the normal stress applied to the first roller 62 and the second roller 64 by the pushing load is reduced by the stopper 66, so that torque applied to the first roller 62 and the second roller 64 causing the first roller 62 and the second roller 64 to roll toward the unlock position side is reduced and P-removal is suppressed from occurring.

On the other hand, when the lock member 42 is moved from the lock position to the unlock position, the stopper 66 is engaged with the guide portion 94 and is mechanically rotated clockwise of the rotation axis S1 against the urging force of the spring member 102, which changes the posture to the retracted posture shown in FIG. 3. In this retracted posture, the engaging surface 66a is separated from the engaging surface 30a, and the second roller 64 is reliably brought into contact with the guide portion 94 so that the lock member 42 can be guided by the guide portion 94. When the lock member 42 is further moved to the left in FIG. 3, the stopper 66 is rotated so as to ride on the guide portion 94 and is held in the retracted posture. Further, when the lock member 42 is moved to the right in FIG. 3 and reaches the lock position, the stopper 66 is rotated counterclockwise of the rotation axis S1 in accordance with the urging force of the spring member 102, which establishes the protruding posture shown in FIG. 2. The guide portion 94 also functions as a posture changing portion that changes the posture of the stopper 66.

As described above, in the vehicle parking lock mechanism 10 of the first embodiment, since the stopper 66 is rotatably provided on the lock member 42 and the stopper 66 takes the protruding posture where the stopper 66 protrudes toward the support member 30 side in the parking lock state, the pushing load for pushing the parking pawl 40 out of the parking gear 44 is generated when parking on a slope, and when the pushing load is applied from the parking pawl 40 to the lock member 42 via the cam mechanism 96, the stopper 66 is compressed between the lock member 42 and the support member 30. As a result, since the stopper 66 bears a part of the pushing load acting on the lock member 42, the force applied to the lock member 42 in the retracting direction toward the unlock position side based on the pushing load is reduced, and the P-removal where the parking pawl 40 comes off the parking gear 44 due to the retraction is suppressed from occurring. In the first embodiment, the normal stress applied to the first roller 62 and the second roller 64 by the pushing load is reduced by the stopper 66, so that torque applied to the first roller 62 and the second roller 64 causing the first roller 62 and the second roller 64 to roll toward the unlock position side is reduced and the P-removal is suppressed from occurring. In that case, since the stopper 66 is compressed between the lock member 42 and the support member 30 and receives a compressive load, the strength required for the stopper 66 and the lock member 42 is reduced as compared with the case where a bending load is applied as in the related art, and it is possible to reduce the size and weight of the stopper 66 and the lock member 42.

Further, the gap between the stopper 66, which is in the protruding posture in the parking lock state, and the support member 30, that is, the gap between the engaging surface 66a and the engaging surface 30a is equal to or less than the gap between the second roller 64 of the lock member 42 and the guide portion 94, and any gap is set to substantially zero in the first embodiment. Therefore, when the pushing load is applied to the lock member 42, the stopper 66 is reliably compressed between the lock member 42 and the support member 30, and the effect of suppressing the P-removal from occurring when parking on a slope can be appropriately obtained.

Further, while the stopper 66 is urged by the spring member 102 so as to be in the protruding posture, the guide portion 94 of the support member 30 also functions as the posture changing portion, and changes the stopper 66 to the retracted posture when the lock member 42 is moved to the unlock position. In this way, the stopper 66 is reliably changed to the protruding posture and the retracted posture in accordance with the position of the lock member 42. As a result, in the process of moving the lock member 42 from the unlock position to the lock position, the stopper 66 is held in the retracted posture, and the lock member 42 is guided by the guide portion 94 so that the parking pawl 40 is engaged with the parking gear 44 via the cam mechanism 96 to be in the parking lock state, and in the parking lock state, the stopper 66 is held in the protruding posture so that the P-removal when parking on a slope can be appropriately suppressed from occurring.

Further, the cam mechanism 96 includes the pair of the first roller 62 and the second roller 64 provided on the lock member 42 and the cam surface 92 provided on the parking pawl 40. In addition, the first roller 62 is engaged with the cam surface 92 and the second roller 64 is engaged with the guide portion 94, so that the lock member 42 can be moved smoothly between the lock position and the unlock position with the rotation of the first roller 62 and the second roller 64. In this case, when the pushing load that pushes the parking pawl 40 out of the parking gear 44 is generated when parking on a slope, the lock member 42 may easily move to the unlock position side due to the pushing load and the P-removal may occur. Thus, the effect of the present disclosure of providing the stopper 66 to suppress the P-removal from occurring when parking on a slope can be remarkably obtained.

Further, the stopper 66 in the protruding posture and the support member 30 are engaged with each other in the engagement range L1 including both sides of the vertical line V1 passing through the rotation axis S1 in the moving direction of the lock member 42, and the engagement range L1 includes a portion located further on the unlock position side than the rotation axis S1. Therefore, when the pushing load acts on the lock member 42 and a force in the direction of moving the lock member 42 to the unlock position side is applied, the stopper 66 changes its posture with an engaging point P1 on the unlock position side in the engagement range L1 acting as the support point and the mounting pin 100 is rotated in the lower left direction in FIG. 7 about the engaging point P1. Thus, a force in the direction of pushing back toward the parking pawl 40 is applied to the lock member 42 via the mounting pin 100 and hinders the movement of the lock member 42 to the unlock position side, which appropriately suppresses the P-removal from occurring. In other words, when torque is applied to the stopper 66 in the clockwise direction around the engaging point P1, the lock member 42 is pushed back toward the parking pawl 40 side via the mounting pin 100, so that the movement of the lock member 42 to the unlock position side is hindered.

Next, a first modification of the present disclosure will be described. In the following first modification, the parts substantially common to the example of the first embodiment are designated by the same reference signs, and detailed description thereof will be omitted.

Figure 7:
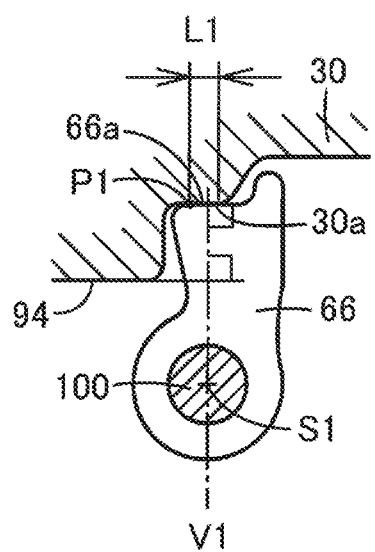
FIG. 7 is a diagram illustrating a state in which a stopper provided on the lock member of the vehicle parking lock mechanism in FIG. 1 is in a protruding posture and is engaged with a support member.
Figure 8:
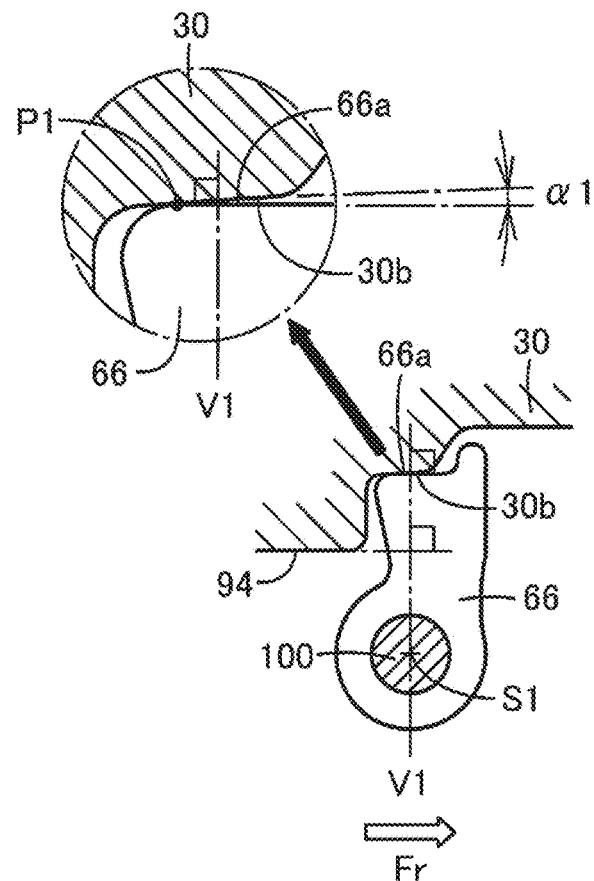
FIG. 8 is a diagram illustrating a first modification of the engagement mode between the stopper and the support member, which is a diagram corresponding to FIG. 7, and is also a diagram showing an enlarged view of the engaging portion.

FIG. 8 showing the first modification is a diagram corresponding to FIG. 7, which also shows an enlarged view of the engaging portion between the stopper 66 and the support member 30. However, an engaging surface 30b provided in the support member 30 is different from the engaging surface 30a in the above example. The engaging surface 30b is inclined at an inclination angle α1 in the direction away from the rotation axis S1 toward the lock position side, which is the right direction in FIG. 8, with respect to a straight line parallel to the moving direction of the lock member 42, that is, a straight line parallel to the guide portion 94. The inclination angle α1 is, for example, in the range of about 0.5° to 2°, and is about 1° in the first modification. The engaging surface 66a of the stopper 66 to be engaged with the engaging surface 30b is parallel to the moving direction of the lock member 42 in the state where the stopper 66 is in the protruding posture, and is engaged with the engaging surface 30b of the support member 30 only at the engaging point P1 located further on the unlock position side than the rotation axis S1. In the first modification, the engaging point P1 is the engaging portion.

According to the first modification, the same operation and effect as those of the above example are obtained, in which since the stopper 66 reduces the normal stress applied to the first roller 62 and the second roller 64 due to the pushing load, the torque generated in the first roller 62 and the second roller 64 in the direction causing the first roller 62 and the second roller 64 to roll to the unlock position side is reduced and the P-removal is suppressed from occurring. In addition to the above operation and effect, since the engaging surface 30b of the support member 30 is inclined in a direction away from the rotation axis S1 toward the lock position side, when the pushing load acts on the lock member 42 and the stopper 66 is pressed against the support member 30, based on the inclination of the engaging surface 30b of the support member 30, torque is generated in the direction in which the rotation axis S1 of the stopper 66 is directed toward the lock position side (counterclockwise direction in FIG. 8) around the engaging point P1, and a force Fr is applied to the lock member 42 in the direction toward the lock position side via the mounting pin 100 of the stopper 66, so that the movement of the lock member 42 to the unlock position side is hindered and the P-removal is further appropriately suppressed from occurring.

Figure 9:
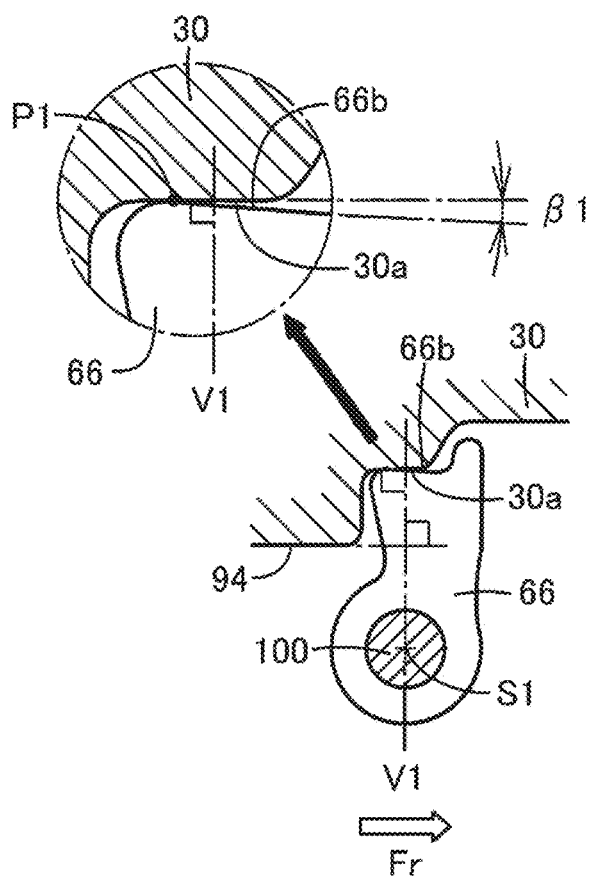
FIG. 9 is a diagram illustrating a second modification of the engagement mode between the stopper and the support member, which is a diagram corresponding to FIG. 7, and is also a diagram showing an enlarged view of the engaging portion.

FIG. 9 showing a second modification is a diagram corresponding to FIG. 7, which also shows an enlarged view of the engaging portion between the stopper 66 and the support member 30. However, an engaging surface 66b provided in the stopper 66 is different from the engaging surface 66a in the above example. The engaging surface 66b is inclined at an inclination angle β1 in the direction closer to the rotation axis S1 toward the lock position side, which is the right direction in FIG. 9, with respect to a straight line parallel to the moving direction of the lock member 42, that is, a straight line parallel to the guide portion 94. The inclination angle β1 is, for example, in the range of about 0.5° to 2°, and is about 1° in the second modification. The engaging surface 30a of the support member 30 to be engaged with the engaging surface 66b is parallel to the moving direction of the lock member 42, and is engaged with the engaging surface 66b of the stopper 66 only at the engaging point P1. In the second modification, the engaging point P1 is the engaging portion.

According to the second modification, the same operation and effect as those of the above first modification are obtained, in which since the stopper 66 reduces the normal stress applied to the first roller 62 and the second roller 64 due to the pushing load, the torque generated in the first roller 62 and the second roller 64 in the direction causing the first roller 62 and the second roller 64 to roll to the unlock position side is reduced and the P-removal is suppressed from occurring. In addition to the above operation and effect, since the engaging surface 66b of the stopper 66 is inclined in a direction closer to the rotation axis S1 toward the lock position side, when the pushing load acts on the lock member 42 and the stopper 66 is pressed against the support member 30, based on the inclination of the engaging surface 66b of the stopper 66, torque is generated in the direction in which the rotation axis S1 of the stopper 66 is directed toward the lock position side (counterclockwise direction in FIG. 9) around the engaging point P1, and a force Fr is applied to the lock member 42 in the direction toward the lock position side via the mounting pin 100 of the stopper 66, so that the movement of the lock member 42 to the unlock position side is hindered and the P-removal is further appropriately suppressed from occurring.

Figure 10:
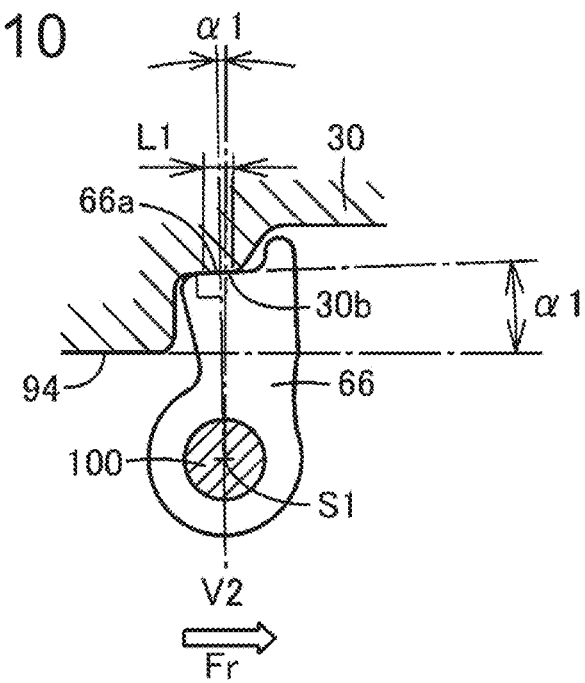
FIG. 10 is a diagram illustrating a third modification of the engagement mode between the stopper and the support member, and is a diagram corresponding to FIG. 7.

A third modification shown in FIG. 10 is different from the first modification in FIG. 8 in that the engaging surface 66a of the stopper 66 in the protruding posture is brought into close contact with the engaging surface 30b of the support member 30, and engaged with the engaging surface 30b in the predetermined engagement range L1. That is, the posture in which a vertical line V2 of the engaging surfaces 30b and 66a passing through the rotation axis S1 inclines by an inclination angle α1 from the direction perpendicular to the extension line of the guide portion 94 parallel to the moving direction of the lock member 42 to the lock position side is the protruding posture. Therefore, also in the third modification, when the pushing load acts on the lock member 42 and the stopper 66 is pressed against the support member 30, a force Fr is applied to the lock member 42 in a direction toward the lock position side based on the inclination of the engaging surface 30b, the movement of the lock member 42 to the unlock position side is hindered, and the P-removal is appropriately suppressed from occurring.

Figure 11:
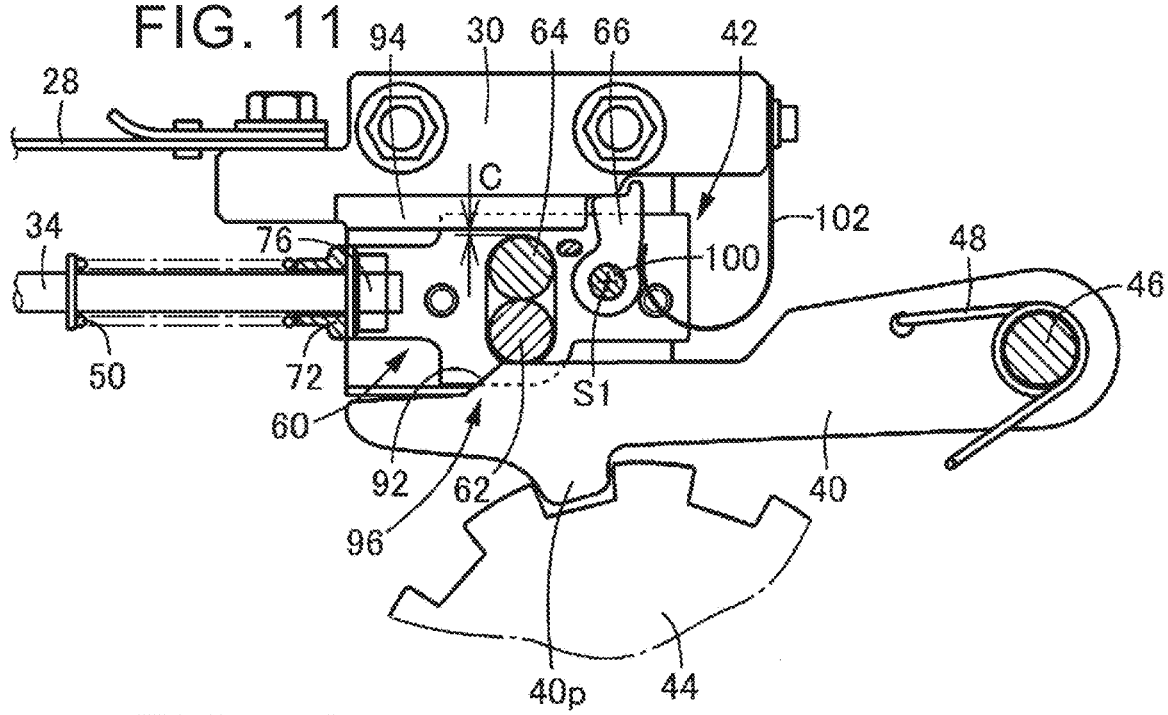
FIG. 11 is a diagram illustrating a second embodiment of the present disclosure, and is a diagram corresponding to FIG. 2.

Next, a second embodiment of the present disclosure will be described. FIG. 11 showing a portion near the lock of the vehicle parking lock mechanism of the second embodiment is a diagram corresponding to FIG. 2. The relative arrangement position between the first roller 62 and the second roller 64 and the stopper 66 is different from that of the first embodiment, and the stopper 66 is provided relatively on the upper side in FIG. 11, that is, at a position closer to the support member 30. In this case, in the parking lock state shown in FIG. 11, that is, in the state where the stopper 66 is in the protruding posture and is engaged with the support member 30, when there is a gap C between the second roller 64 and the guide portion 94 of the support member 30 and the pushing load is applied to the lock member 42, the entire pushing load is received by the support member 30 via the stopper 66. Thus, the normal stress applied to the first roller 62 and the second roller 64 by the pushing load is further reduced by the stopper 66, so that torque applied to the first roller 62 and the second roller 64 and causing the first roller 62 and the second roller 64 to roll to the unlock position side is further reduced and the P-removal is appropriately suppressed from occurring.

Figure 12:
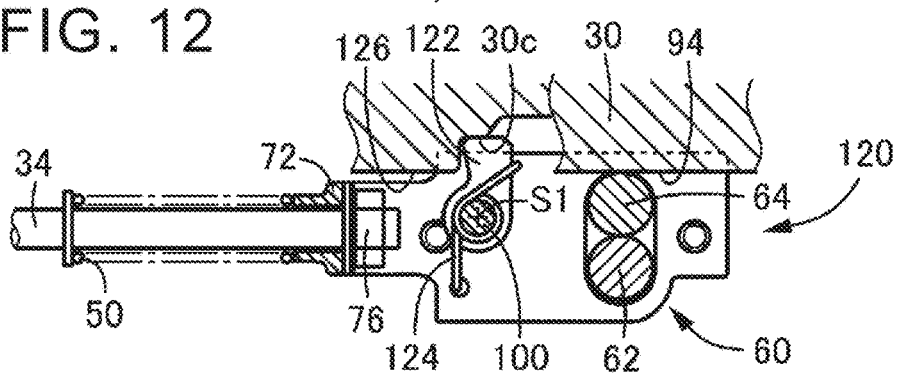
FIG. 12 is a diagram illustrating a third embodiment of the present disclosure, and is a sectional view of a lock member and a support member in a parking lock state.

Next, a third embodiment of the present disclosure will be described. FIG. 12 showing a portion near the lock of the vehicle parking lock mechanism of the third embodiment is a sectional view of the lock member 120 and the support member 30 in the parking lock state, and the arrangement position of the stopper 122 is different from that of the first embodiment. The lock member 120 is configured to include the connecting head 60 like the lock member 42, but in the third embodiment, the mounting pin 100 is provided between the connecting portion 72 of the connecting head 60 and the first roller 62 and the second roller 64, and the stopper 122 is mounted on the mounting pin 100. Further, a spring member (twisted coil spring in the third embodiment) 124, which is an urging device for the stopper 122, is provided across the stopper 122 and the connecting head 60 and urges the stopper 122 in the counterclockwise direction. When the lock member 120 is moved to the lock position, the stopper 122 is brought into the protruding posture in which the stopper 122 is engaged so as to be in close contact with the engaging surface 30c of the support member 30 as shown in FIG. 12. The support member 30 is provided with the posture changing portion 126 separately from the guide portion 94, and the posture changing portion 126 is engaged with the stopper 122 when the lock member 120 is linearly reciprocated between the lock position and the unlock position, which mechanically changes the posture of the stopper 122 to the protruding posture and the retracted posture. The posture changing portion 126 is provided adjacent to the engaging surface 30c on the unlock position side (left side in FIG. 12) and parallel to the moving direction of the lock member 120 so as to protrude toward the lock member 120 side. The engagement mode between the stopper 122 in the protruding posture and the engaging surface 30c can be variously changed as in the first embodiment in FIG. 7, each modification in FIGS. 8 to 10, and the second embodiment in FIG. 11.

Also in the third embodiment, the same operation and effect as those of the above examples can be obtained. Further, since the stopper 122 and the spring member 124 are both provided on the lock member 120, assembling work and the like are facilitated. In each of the above examples, an urging device such as the spring member 124 can be provided on the lock member 42 to urge the stopper 66, and conversely, in the third embodiment, an urging device such as the spring member 102 may be provided on the support member 30 to urge the stopper 122.

Figure 13:
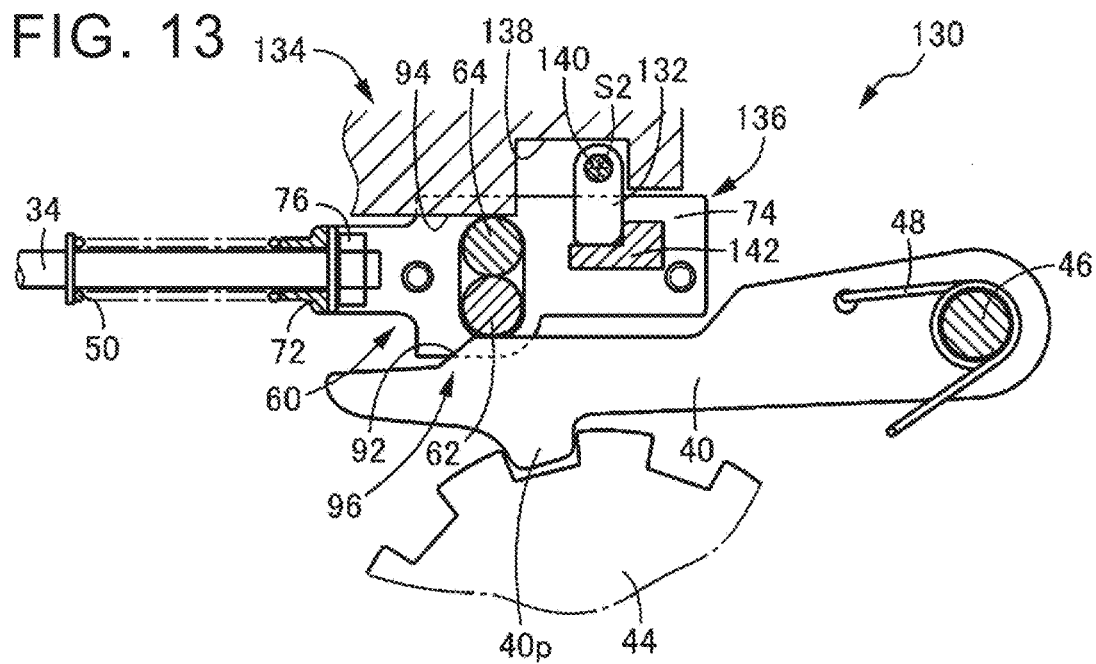
FIG. 13 is a diagram illustrating a fourth embodiment of the present disclosure, which is a diagram illustrating a state in which a stopper is provided on a support member, and is a sectional view corresponding to FIG. 2.
Figure 14:
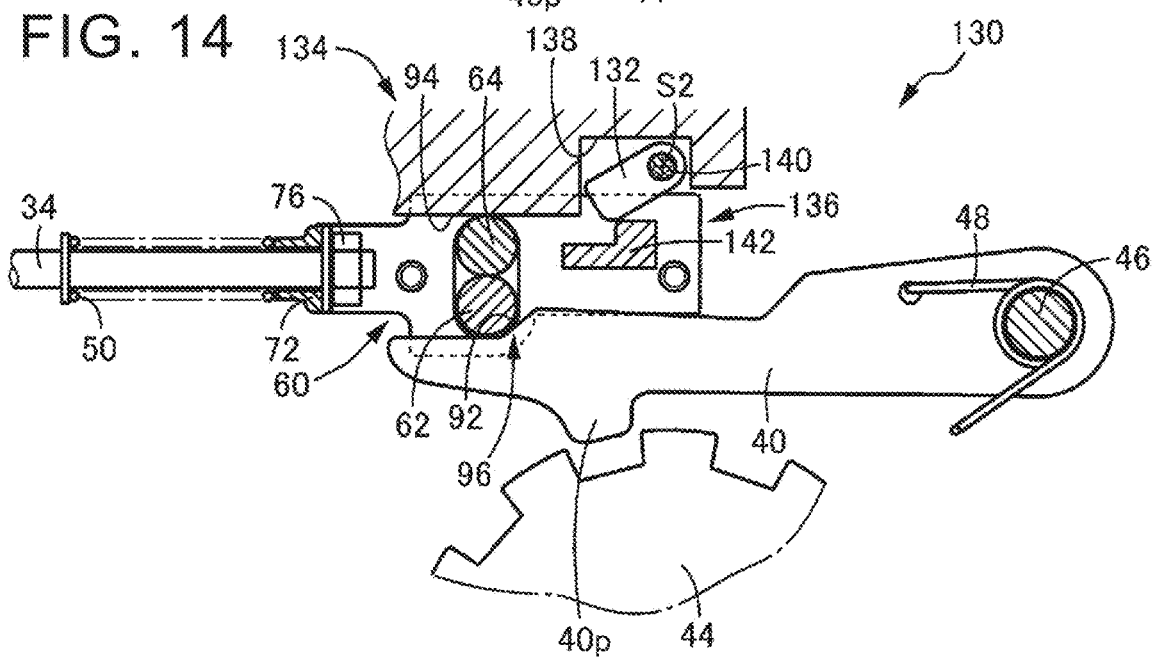
FIG. 14 is a sectional view illustrating an unlocked state in the fourth embodiment in FIG. 13.
Figure 15:
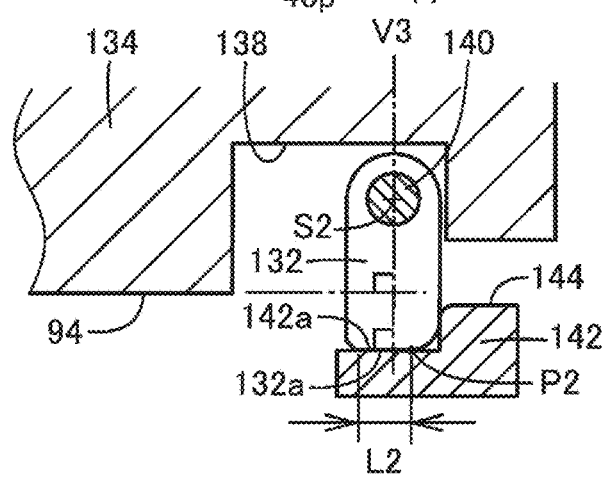
FIG. 15 is an enlarged view illustrating a state in which the stopper provided on the support member is in a protruding posture and is engaged with a lock member in the fourth embodiment in FIG. 13.

Next, a fourth embodiment of the present disclosure will be described. The vehicle parking lock mechanism 130 in FIG. 13, which shows a portion near the lock of the vehicle parking lock mechanism of the fourth embodiment, shows a case where the stopper 132 is provided on the support member 134. FIG. 13 is a sectional view of the parking lock state corresponding to FIG. 2, and FIG. 14 is a sectional view of the unlock state. Further, FIG. 15 is an enlarged view showing a portion in which the stopper 132 provided on the support member 134 is in a protruding posture and is engaged with the lock member 136, and is a view corresponding to FIG. 7. Like the support member 30, the support member 134 is fixed to the transmission case or the like and is provided with the guide portion 94, while a recess 138 for arranging the stopper 132 is provided. The stopper 132 is provided in the recess 138 so as to be rotatable around a rotation axis S2 perpendicular to the moving direction of the lock member 136 via the mounting pin 140, specifically, the rotation axis S2 parallel to the output shaft 16. Further, like the lock member 42, the lock member 136 is configured to include the connecting head 60, but an engaging block 142 is provided, across the pair of the side wall portions 74, on the connecting head 60 on a portion where the stopper 66 is provided.

The stopper 132 is rotated around the rotation axis S2 to change its posture between the protruding posture shown in FIG. 13 and the retracted posture shown in FIG. 14. The stopper 132 is urged in the counterclockwise direction of the mounting pin 140 by an urging device (not shown) provided on the support member 134 or the lock member 136, and in the state where the lock member 136 is moved to the lock position shown in FIG. 13, the stopper 132 is held in the protruding posture in accordance with the urging force of the urging device. This protruding posture is a posture in which the stopper 132 protrudes toward the lock member 136. As shown in an enlarged manner in FIG. 15, an engaging surface 132a provided at the tip portion of the stopper 132 is brought into close contact with an engaging surface 142a provided on the engaging block 142 of the lock member 136, and the stopper 132 is in a vertical posture in which the rotation axis S2 is located on a vertical line V3 of the engaging surfaces 132a and 142a. The engaging surface 142a is provided parallel to the moving direction of the lock member 136 (right-left direction in FIG. 15), and is brought into close contact with the engaging surface 132a in an engagement range L2 including both sides of the vertical line V3 passing through the rotation axis S2 in the moving direction of the lock member 136. The engagement range L2 is appropriately determined in the same manner as the engagement range L1. The stopper 132 has a predetermined width dimension in a direction parallel to the rotation axis S2 (front and back directions of the paper surface in FIG. 15), and the engaging surfaces 132a and 142a have a rectangular flat contact surface having a predetermined size. However, one of the engaging surfaces 132a and 142a may be hemispherical or semi-cylindrical so that the engaging surfaces 132a and 142a are in point contact or line contact with each other. In the fourth embodiment, the support member 134 on which the stopper 132 is provided is one member, the lock member 136 is the other member, and the engagement range L2 corresponds to the engaging portion.

The engaging block 142 is provided with a posture changing portion 144 adjacent to the engaging surface 142a on the lock position side (right side in FIG. 15) and protruding toward the support member 134 side in parallel with the moving direction of the lock member 136. When the lock member 136 is moved from the lock position to the unlock position, the stopper 132 is engaged with the posture changing portion 144 and is mechanically rotated clockwise of the rotation axis S2 against the urging force of the urging device to change its posture to the retracted posture shown in FIG. 14. The size of the recess 138 is determined so as to allow the stopper 132 to change its posture to the retracted posture.

Also in the fourth embodiment, substantially the same operation and effect as those in the first embodiment can be obtained. For example, when the pushing load for pushing the parking pawl 40 out of the parking gear 44 is generated when parking on a slope, and the pushing load is applied from the parking pawl 40 to the lock member 136 via the cam mechanism 96, the stopper 132 is compressed between the lock member 136 and the support member 134. As a result, since the stopper 132 bears a part of the pushing load acting on the lock member 136, the force applied to the lock member 136 in the retracting direction toward the unlock position side based on the pushing load is reduced, and the P-removal where the parking pawl 40 comes off the parking gear 44 due to the retraction is suppressed from occurring. That is, the normal stress applied to the first roller 62 and the second roller 64 by the pushing load is reduced by the stopper 132, so that torque applied to the first roller 62 and the second roller 64 and causing the first roller 62 and the second roller 64 to roll to the unlock position side is reduced and the P-removal is suppressed from occurring. In that case, since the stopper 132 is compressed between the lock member 136 and the support member 134 and receives a compressive load, the strength required for the stopper 132 and the support member 134 is reduced as compared with the case where a bending load is applied as in the related art, and it is possible to reduce the size and weight of the stopper 132 and the support member 134.

Further, the stopper 132 in the protruding posture and the lock member 136 are engaged with each other in the engagement range L2 including both sides of the vertical line V3 passing through the rotation axis S2 in the moving direction of the lock member 136, and the engagement range L2 includes a portion located further on the lock position side than the rotation axis S2 (right side in FIG. 15). Therefore, when the pushing load acts on the lock member 136, a force in the direction of moving the lock member 136 to the unlock position side is applied, and the stopper 132 changes its posture around the rotation axis S2 on the support member 134 side, the engaging point P2 on the lock position side in the engagement range L2 is rotated in the lower left direction in FIG. 15 about the rotation axis S2 and a force is applied to the lock member 136 in the direction of pushing back toward the parking pawl 40, thereby hindering the movement of the lock member 136 to the unlock position side, which appropriately suppresses the P-removal from occurring. In other words, when torque is applied to the stopper 132 in the clockwise direction around the rotation axis S2, the lock member 136 is pushed back toward the parking pawl 40 side via the engaging point P2, so that the movement of the lock member 136 to the unlock position side is hindered.

Further, even when the stopper 132 is provided on the support member 134 in this way, the engagement mode between the stopper 132 in the protruding posture and the engaging block 142 can be variously changed as is described in the first embodiment in FIG. 7, each modification in FIGS. 8 to 10, and the second embodiment in FIG. 11, and the arrangement positions of the stopper 132 and the engaging block 142 can also be changed as shown in FIG. 12 showing the third embodiment, for example.

Figure 16:
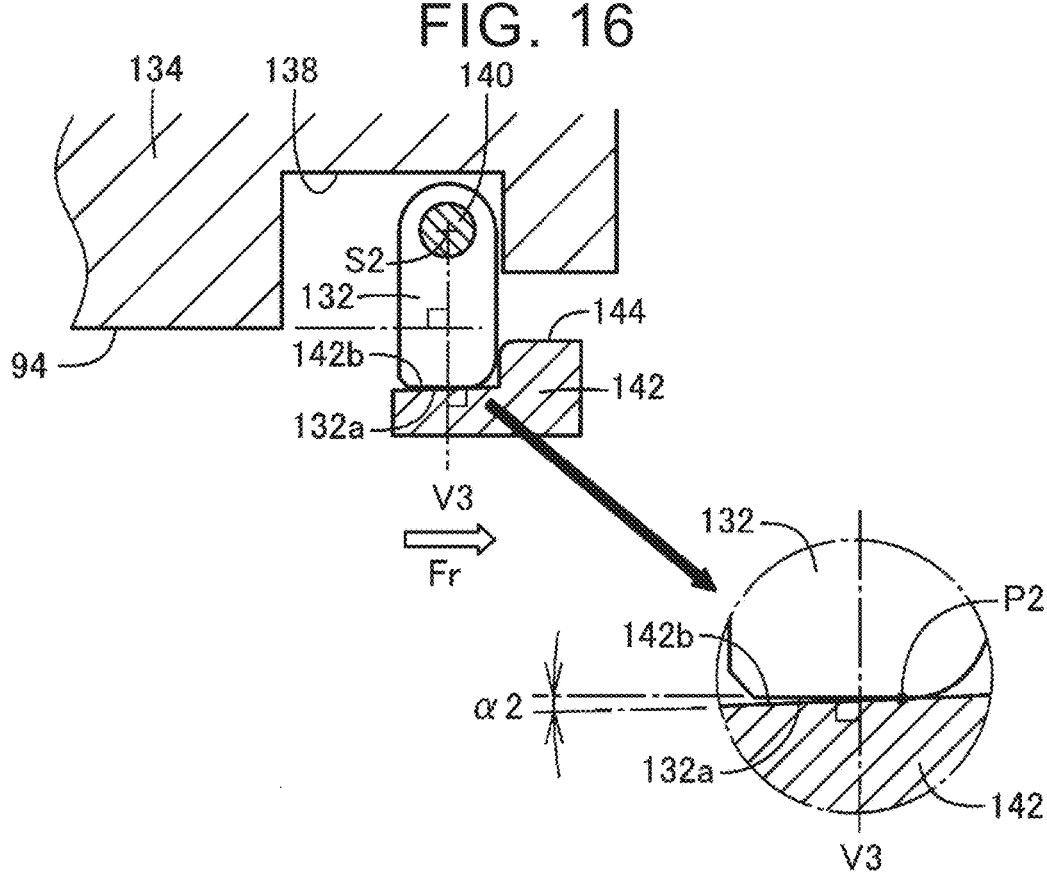
FIG. 16 is a diagram illustrating a first modification of the fourth embodiment of the engagement mode between the stopper and the lock member shown in FIG. 13, and is a diagram corresponding to FIG. 15, and is also a diagram showing an enlarged view of the engaging portion.

For example, FIG. 16 is a first modification of the fourth embodiment corresponding to FIG. 8 showing the first modification of the first embodiment, and the engaging surface 142b provided on the engaging block 142 is inclined at an inclination angle α2 in the direction away from the rotation axis S2 toward the unlock position side, which is the left direction in FIG. 16, with respect to a straight line parallel to the moving direction of the lock member 136, that is, a straight line parallel to the guide portion 94. Like the inclination angle α1, the inclination angle α2 is, for example, in the range of about 0.5° to 2°, and is about 1° in the first modification. The engaging surface 132a of the stopper 132 to be engaged with the engaging surface 142b is parallel to the moving direction of the lock member 136 in the state where the stopper 132 is in the protruding posture, and is engaged with the engaging surface 142b of the engaging block 142 only at the engaging point P2 located further on the lock position side than the rotation axis S2. In the first modification, the engaging point P2 is the engaging portion.

According to the first modification of the fourth embodiment, the same operation and effect as the fourth embodiment in FIG. 15 are obtained, in which since the stopper 132 reduces the normal stress applied to the first roller 62 and the second roller 64 due to the pushing load, the torque generated in the first roller 62 and the second roller 64 in the direction causing the first roller 62 and the second roller 64 to roll to the unlock position side is reduced and the P-removal is suppressed from occurring. Since the engaging surface 142b of the engaging block 142 is inclined in a direction away from the rotation axis S2 toward the unlock position side, when the pushing load acts on the lock member 136 and the engaging block 142 is pressed against the stopper 132, torque is generated in the stopper 132 in the counterclockwise direction around the rotation axis S2 based on the inclination of the engaging surface 142b of the engaging block 142. That is, torque is generated in the direction in which the engaging point P2 is directed toward the lock position side (right side in FIG. 16), and a force Fr is applied to the lock member 136 in the direction toward the lock position side via the engaging point P2. Thus, the movement of the lock member 136 to the unlock position side is hindered, and the P-removal is more appropriately suppressed from occurring.

Figure 17:
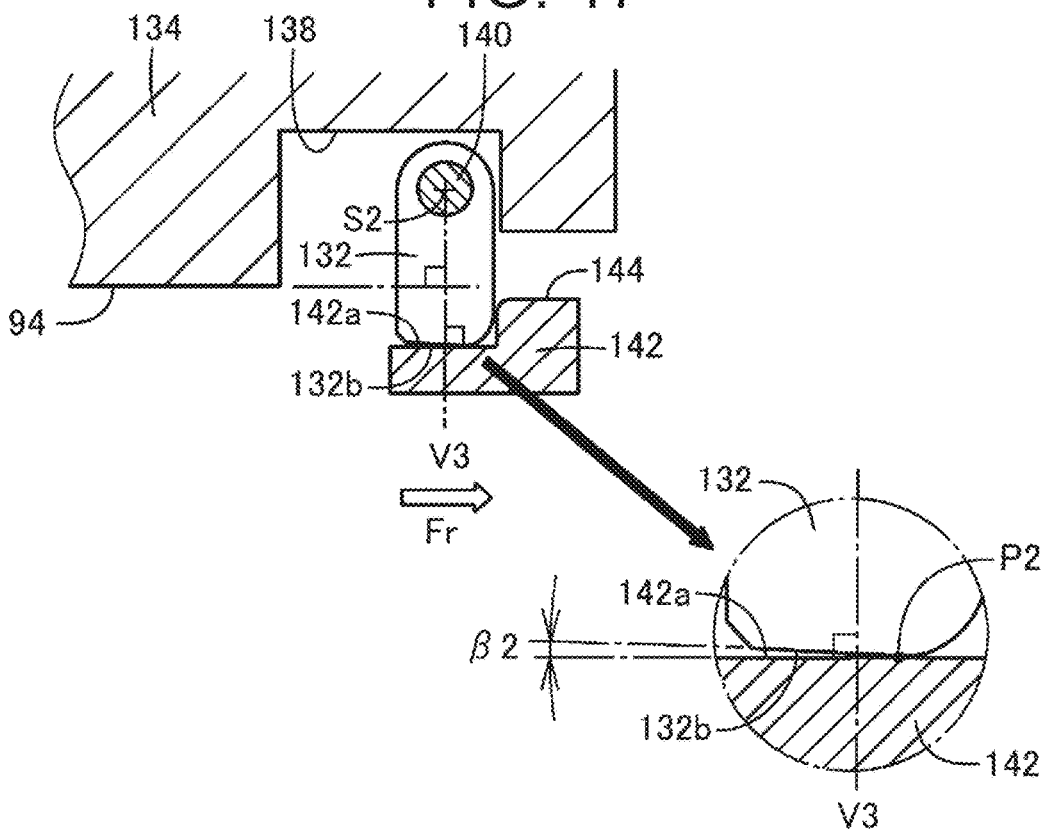
FIG. 17 is a diagram illustrating a second modification of the fourth embodiment of the engagement mode between the stopper and the lock member shown in FIG. 13, and is a diagram corresponding to FIG. 15, and is also a diagram showing an enlarged view of the engaging portion.

FIG. 17 showing a second modification of the fourth embodiment is a diagram corresponding to the diagram showing an enlarged diagram of the fourth embodiment in FIG. 15 and also shows an enlarged view of the engaging portion between the stopper 132 and the engaging block 142. The engaging surface 132b provided on the stopper 132 is different from the engaging surface 132a of the fourth embodiment in FIG. 15. The engaging surface 132b is inclined at an inclination angle β2 in the direction closer to the rotation axis S2 toward the unlock position side, which is the left direction in FIG. 17, with respect to a straight line parallel to the moving direction of the lock member 136, that is, a straight line parallel to the guide portion 94. The inclination angle β2 is, for example, in the range of about 0.5° to 2°, and is about 1° in the second modification of the fourth embodiment. The engaging surface 142a of the engaging block 142 to be engaged with the engaging surface 132b is parallel to the moving direction of the lock member 136, and is engaged with the engaging surface 132b of the stopper 132 only at the engaging point P2 located further on the lock position side than the rotation axis S2. In the second modification of the fourth embodiment, the engaging point P2 is the engaging portion.

According to the second modification of the fourth embodiment, in addition to obtaining the same operation and effect as those of the fourth embodiment in FIG. 15, since the engaging surface 132b of the stopper 132 is inclined in the direction closer to the rotation axis S2 toward the unlock position side, when the pushing load acts on the lock member 136 and the engaging block 142 is pressed against the stopper 132, based on the inclination of the engaging surface 132b of the stopper 132, torque is generated in the stopper 132 in the counterclockwise direction around the rotation axis S2. That is, torque is generated in the direction in which the engaging point P2 is directed toward the lock position side (right side in FIG. 17), and a force Fr is applied to the lock member 136 in the direction toward the lock position side via the engaging point P2. Thus, the movement of the lock member 136 to the unlock position side is hindered, and the P-removal is more appropriately suppressed from occurring.

Figure 18:
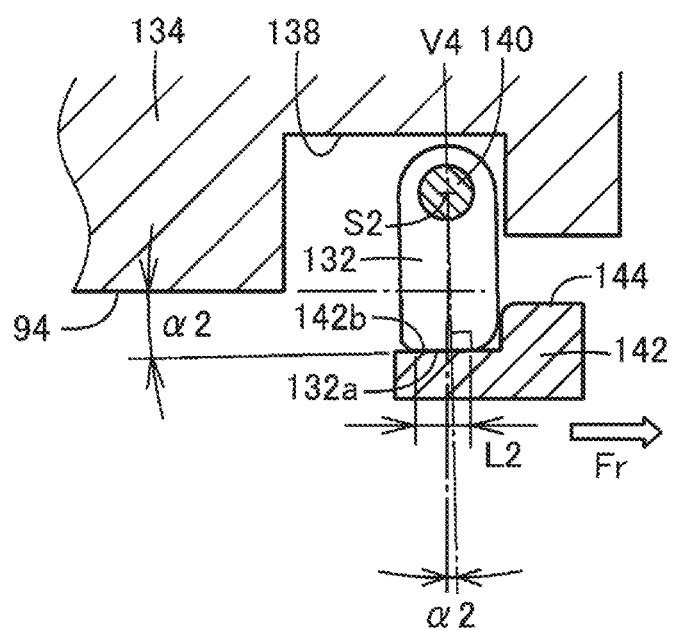
FIG. 18 is a diagram illustrating a third modification of the fourth embodiment of the engagement mode between the stopper and the lock member shown in FIG. 13, and is a diagram corresponding to FIG. 15.

A third modification of the fourth embodiment shown in FIG. 18 is different from the first modification of the fourth embodiment in FIG. 16 in that the engaging surface 132a of the stopper 132 in the protruding posture is brought into close contact with the engaging surface 142b of the engaging block 142, and engaged with the engaging surface 142b in the predetermined engagement range L2. That is, the posture in which a vertical line V4 of the engaging surfaces 132a and 142b passing through the rotation axis S2 inclines by an inclination angle α2 from the direction perpendicular to the extension line of the guide portion 94 parallel to the moving direction of the lock member 136 to the lock position side is the protruding posture. Therefore, also in the third modification of the fourth embodiment, when the pushing load acts on the lock member 136 and the engaging block 142 is pressed against the stopper 132, a force Fr is applied to the lock member 136 in a direction toward the lock position side based on the inclination of the engaging surface 142b, the movement of the lock member 136 to the unlock position side is hindered, and the P-removal is appropriately suppressed from occurring.

Although each embodiment of the present disclosure and its modifications have been described in detail with reference to the drawings, the above description is merely an example, and the present disclosure can be implemented in various modified and improved modes based on the knowledge of those skilled in the art.

What is claimed is:

1. A vehicle parking lock mechanism comprising:
   a parking gear;
   a parking pawl that is provided so as to be brought closer to and separated from the parking gear and that is configured to mechanically hinder rotation of the parking gear by being engaged with the parking gear;
   a lock member that is provided so as to be reciprocally movable between a lock position and an unlock position and that is configured to, in response to the lock member being moved to the lock position, bring the parking pawl closer to the parking gear via a cam mechanism such that the lock member is moved to the lock position to establish a parking lock state in which the parking pawl hinders rotation of the parking gear;
   a support member that is provided on an opposite side of the lock member from the parking pawl and that includes a guide portion configured to guide movement of the lock member between the lock position and the unlock position while restricting the lock member from displacing in a direction away from the parking pawl; and
   a stopper that is rotatably mounted to one of the lock member or the support member, that is configured to change a posture in accordance with relative movement between the lock member and the support member, and that is configured to, in the parking lock state, protrude toward another one of the lock member or the support member, wherein
   the stopper has an engaging surface configured to be engaged with said another one of the lock member or the support member to establish a protruding posture in the parking lock state, and
   in response to the lock member being moved from the lock position to the unlock position, the engaging surface of the stopper is separated from said another one of the lock member or the support member.

2. The vehicle parking lock mechanism according to claim 1, wherein in the parking lock state, a gap between the stopper in the protruding posture and said another one of the lock member or the support member is equal to or less than a gap between the lock member and the guide portion.

3. The vehicle parking lock mechanism according to claim 1, wherein
   the stopper is urged by an urging force of an urging device so as to be in the protruding posture; and
   said another one of the lock member or the support member includes a posture changing portion configured to be engaged with the stopper in response to the lock member being moved from the lock position to the unlock position such that the stopper changes a posture to a retracted posture against the urging force of the urging device, enabling the lock member to be guided by the guide portion.

4. The vehicle parking lock mechanism according to claim 1, wherein
   the cam mechanism includes a pair of a first roller and a second roller and a cam surface, the first roller and the second roller being provided on the lock member so as to be rotatable around axes perpendicular to a moving direction of the lock member and parallel to each other such that outer peripheral surfaces are in contact with each other, and the cam surface being provided on the parking pawl and configured to be engaged with the first roller in response to the lock member being moved from the unlock position to the lock position such that the parking pawl is brought closer to the parking gear to be engaged with the parking gear; and
   the second roller is configured to be engaged with the guide portion in response to the lock member being moved from the unlock position to the lock position such that the lock member is restricted from displacing in a direction away from the parking pawl.

5. The vehicle parking lock mechanism according to claim 1, wherein
the stopper is mounted to the lock member so as to be rotatable around a rotation axis perpendicular to the moving direction of the lock member; and
the engaging surface of the stopper in the protruding posture with the support member includes a portion located further on a side of the unlock position than the rotation axis in the moving direction of the lock member.

6. The vehicle parking lock mechanism according to claim 5, wherein an engaging surface of the support member that is engaged with the stopper is inclined in a direction away from the rotation axis toward the side of the lock position with respect to a straight line parallel to the moving direction of the lock member.

7. The vehicle parking lock mechanism according to claim 6, wherein an inclination angle in the direction away from the rotation axis is an angle within a range of 0.5° to 2°.

8. The vehicle parking lock mechanism according to claim 5, wherein the engaging surface of the stopper that is engaged with the support member is inclined in a direction closer to a rotation axis toward the side of the lock position with respect to a straight line parallel to the moving direction of the lock member.

9. The vehicle parking lock mechanism according to claim 8, wherein an inclination angle in the direction closer to the rotation axis is an angle within a range of 0.5° to 2°.

10. The vehicle parking lock mechanism according to claim 1, wherein
the stopper is mounted to the support member so as to be rotatable around a rotation axis perpendicular to the moving direction of the lock member; and
the engaging surface of the stopper in the protruding posture with the lock member includes a portion located further on a side of the lock position than the rotation axis in the moving direction of the lock member.

11. The vehicle parking lock mechanism according to claim 10, wherein an engaging surface of the lock member that is engaged with the stopper is inclined in a direction away from the rotation axis toward a side of the unlock position with respect to a straight line parallel to the moving direction of the lock member.

12. The vehicle parking lock mechanism according to claim 11, wherein an inclination angle in the direction away from the rotation axis is an angle within a range of 0.5° to 2°.

13. The vehicle parking lock mechanism according to claim 10, wherein the engaging surface of the stopper that is engaged with the lock member is inclined in a direction closer to the rotation axis toward a side of the unlock position with respect to a straight line parallel to the moving direction of the lock member.

14. The vehicle parking lock mechanism according to claim 13, wherein an inclination angle in the direction closer to the rotation axis is an angle within a range of 0.5° to 2°.

15. A vehicle parking lock mechanism, comprising:
a parking gear;
a parking pawl that is provided so as to be brought closer to and separated from the parking gear and that is configured to mechanically hinder rotation of the parking gear by being engaged with the parking gear;
a lock member that is provided so as to be reciprocally movable between a lock position and an unlock position and that is configured to, when the lock member is moved to the lock position, bring the parking pawl closer to the parking gear via a cam mechanism such that the lock member is moved to the lock position to establish a parking lock state in which the parking pawl hinders rotation of the parking gear;
a support member that is provided on an opposite side of the lock member from the parking pawl and that includes a guide portion configured to guide movement of the lock member between the lock position and the unlock position while restricting the lock member from displacing in a direction away from the parking pawl; and
a stopper that is rotatably mounted to one of the lock member or the support member, that is configured to change a posture in accordance with relative movement between the lock member and the support member, and that is configured to, in the parking lock state, protrude toward another one of the lock member or the support member to be engaged with said another one of the lock member or the support member to establish a protruding posture,
wherein
the stopper is mounted to the lock member so as to be rotatable around a rotation axis perpendicular to the moving direction of the lock member,
an engaging portion of the stopper in the protruding posture with the support member includes a portion located further on a side of the unlock position than the rotation axis in the moving direction of the lock member, and
an engaging surface of the engaging portion on a side of the support member that is engaged with the stopper is inclined in a direction away from the rotation axis toward the side of the lock position with respect to a straight line parallel to the moving direction of the lock member.

16. A vehicle parking lock mechanism, comprising:
a parking gear;
a parking pawl that is provided so as to be brought closer to and separated from the parking gear and that is configured to mechanically hinder rotation of the parking gear by being engaged with the parking gear;
a lock member that is provided so as to be reciprocally movable between a lock position and an unlock position and that is configured to, when the lock member is moved to the lock position, bring the parking pawl closer to the parking gear via a cam mechanism such that the lock member is moved to the lock position to establish a parking lock state in which the parking pawl hinders rotation of the parking gear;
a support member that is provided on an opposite side of the lock member from the parking pawl and that includes a guide portion configured to guide movement of the lock member between the lock position and the unlock position while restricting the lock member from displacing in a direction away from the parking pawl; and
a stopper that is rotatably mounted to one of the lock member or the support member, that is configured to change a posture in accordance with relative movement between the lock member and the support member, and that is configured to, in the parking lock state, protrude toward another one of the lock member or the support member to be engaged with said another one of the lock member or the support member to establish a protruding posture,
wherein the stopper is mounted to the support member so as to be rotatable around a rotation axis perpendicular to the moving direction of the lock member, and an engaging portion of the stopper in the protruding posture with the lock member includes a portion located further on a side of the lock position than the rotation axis in the moving direction of the lock member.

* * * * *